(12) United States Patent
Kuwamoto

(10) Patent No.: US 7,636,093 B1
(45) Date of Patent: Dec. 22, 2009

(54) PARAMETERIZED MOTION PATHS

(75) Inventor: Sho Kuwamoto, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 218 days.

(21) Appl. No.: 11/192,986

(22) Filed: Jul. 29, 2005

(51) Int. Cl.
*G06T 13/00* (2006.01)
*G06T 15/70* (2006.01)
*G06T 15/00* (2006.01)

(52) U.S. Cl. ...................... 345/474; 345/959
(58) Field of Classification Search ......... 345/473–475
See application file for complete search history.

(56) References Cited

U.S. PATENT DOCUMENTS

| | | | | |
|---|---|---|---|---|
| 5,359,703 | A * | 10/1994 | Robertson et al. | 345/419 |
| 5,717,848 | A * | 2/1998 | Watanabe et al. | 345/474 |
| 5,933,549 | A * | 8/1999 | Ide et al. | 382/309 |
| 6,278,455 | B1 * | 8/2001 | Baker | 715/716 |
| 6,377,276 | B1 * | 4/2002 | Ludtke | 345/620 |
| 6,414,684 | B1 * | 7/2002 | Mochizuki et al. | 345/473 |
| 6,512,522 | B1 * | 1/2003 | Miller et al. | 345/474 |
| 6,989,848 | B2 * | 1/2006 | Lipsky et al. | 345/671 |
| 2002/0089504 | A1 * | 7/2002 | Merrick et al. | 345/473 |
| 2003/0126136 | A1 * | 7/2003 | Omoigui | 707/10 |
| 2003/0195923 | A1 * | 10/2003 | Bloch et al. | 709/203 |
| 2004/0009813 | A1 * | 1/2004 | Wind | 463/30 |
| 2004/0148307 | A1 * | 7/2004 | Rempell | 707/102 |
| 2005/0038796 | A1 * | 2/2005 | Carlson et al. | 707/100 |
| 2005/0046630 | A1 * | 3/2005 | Jacob et al. | 345/475 |
| 2008/0147981 | A1 * | 6/2008 | Crick et al. | 711/133 |

OTHER PUBLICATIONS

"Macromedia® FlashTM MX 2004 Using Flash;" Jun. 2004, pp. 147-175 and 309-318.*
deHaan, Jen; "Animation and Effects with Macromedia® FlashTM MX 2004;" Nov. 15, 2004, Macromedia Press, Chapter 7 "Scripted Animation Basics" under sub-heading "Animating Shapes Using the Built-In Tween Classes," pp. 1-7.*
"Macromedia® FlashTM MX 2004 ActionScript Language Reference;" Jun. 2004, pp. 491-492.*
Macromedia® FlashTM MX 2004 Using ActionScript in Flash; Jun. 2004, pp. 1-63.*
"Macromedia® Flash TM MX 2004 ActionScript Language Reference;" Jun. 2004, pp. 54 and 504.*
"Macromedia® FlashTM MX 2004 ActionScript Language Reference;" Jun. 2004, p. 349.*

* cited by examiner

*Primary Examiner*—Ulka Chauhan
*Assistant Examiner*—Crystal Murdoch (57) ABSTRACT

A system and method for generating a conditional animation of an unknown object is described. In creating the animation, a representative starting point is designated for an object. A representative ending point is also selected by the designer for the object. The designer/developer may then create a representative motion path for the object. The designer then defines a transformation to translate a position of unknown object, when it is determined, relative to the representative starting and ending points and the representative motion path.

22 Claims, 5 Drawing Sheets

PARAMETERIZED MOTION PATHS

TECHNICAL FIELD

The present invention relates, in general, to graphical animation and, more specifically, to parameterized motion paths in animations.

BACKGROUND OF THE INVENTION

As computer technology has advanced, the richness and complexity of computer graphics has also steadily increased. Early animations were typically static files that transformed the physical animation paradigm, used in early film animation, to the electronic world. Multiple layers (i.e., cells) of static frames are displayed in quick succession giving the illusion of motion and, thus, animation. In the physical world, individual frame transparencies on cellulose or some other such material were typically flipped on top of one another creating a layering that visually provided the appearance of motion. In the electronic world, the computer display essentially mimics this process by sequentially rendering each frame in order, again, giving the illusion of motion.

Traditionally, each animation space, the physical and electronic, generally use timelines to manage and control the animation. In the physical world, such timelines are often summarized into storyboards, which set the timing of when the animation should display a certain set of subjects or key frames and the state in which each such subject should be. In the electronic world, the timeline generally sets the overall chronological progression for each frame rendering including each object within each frame. A timer mechanism, coupled with a parameter that controls how many frames are to be displayed per time unit, usually work together to control the progress of any given electronic animation. Electronic animations have typically been created and placed as static files onto Web pages or a CD-ROM or other similar storage media. Because the animations are run according to the timeline, animation content is usually static. For example, the subject of the animation may start at point A and travel to point B over a set path. All three such parameters are typically known and set from the creation of the animation. The developer usually sets point A, sets point B, and determines the path that will be used to move from point A to point B. Alternatively, the developer will set point A, determine a path, and then allow the path or time progression to determine the end point, point B. This information is hard-coded onto a file that is accessible through a Web server, a type of physical storage media, such as a CD-ROM, or the like.

As the Internet has become more of an interactive business source, Web pages and Websites have become more dynamic. Application servers generally use an application server language and scripting language, such as MACROMEDIA INC.'s COLDFUSION™ MARKUP LANGUAGE (CFML), MICROSOFT CORPORATION's ACTIVE SERVER PAGES™ (ASP & ASP.NET™) and C#™ or VISUAL BASIC™ (VB) scripting languages, SUN MICROSYSTEMS, INC.'s JAVA™ SERVER PAGES (JSP) and JAVA™ scripting language, the open source standard Common Gateway Interface (CGI) and Practical Extraction and Reporting Language (PERL) scripting language, and the like. The code for the application server language typically resides on the Web server or application server. When it is called by a client, the code executes and usually performs some kind of calculation or gathers some kind of data from an external source, such as a database or the like, and then assembles all of the processed and/or retrieved information into an HTML file formatted according to the instructions in the application server logic and then transmitted to the requesting client's Web browser. The processed/retrieved information will then be presented to the user on the Web browser at the requesting client in a manner that was determined by the programmer of the application server language.

In the interactive world of application servers and application server languages, the final appearance of any Web page generated by one of these technologies is usually not set until the processing and/or retrieving of the information has been completed. This may not even be completed until the user interacts with some HTML form or other kind of interactive user interface to provide additional information. An example of such a system would be an airline reservation system. The general look and style of the resulting Web page will have a consistent feel; however, the final appearance, with any search results or reservation results will not be set until the user interacts with the backend logic of the airline system. Not only is the final appearance of the Web page not set by the time the application server or behind-the-scenes logic is made available to the public, it will not be set until the user has entered the flight information or request for flight information. Without the pre-knowledge of the various objects that will eventually be displayed on any given generated Web page, it is difficult to provide animations of these arbitrary and unknown objects.

Because animation can be an effective tool for enhancing the user experience in any interactive Web application, techniques were developed to overcome this shortcoming in implementing animated graphics on dynamic Web applications. Even though designing animations is much simpler using the timeline-based systems, such as MACROMEDIA FLASH™ and DIRECTOR™, such development environments could not easily be used by the graphical designers to create conditional animations of unknown items. Instead, experienced programmers code complicated logic that explicitly describes how any animations of such unknown objects would occur on the Web page. Taking the examples of FLASH™ and DIRECTOR™, after a designer creates the graphics associated with the animation or interactive media, experienced programmers code complicated and explicit blocks in ACTIONSCRIPT™, the scripting language from MACROMEDIA, INC., that is native to FLASH™, or LINGO™, the scripting language from MACROMEDIA, INC., that is native to DIRECTOR™, that handle any animation of arbitrary screen objects.

Code developers typically write the explicit code that examines such objects and then express how those objects would be moved around the display canvas. Alternatively, the code developers would employ a more object-oriented approach that defines the object classes and describes how instances of such objects would behave and/or move in various situations. Either of these coding techniques allows developers to provide animation of arbitrary display objects that are known only at or during runtime. However, experienced programmers are used to create this animation capability. This adds a layer of complexity to animation that was previously not necessary.

In the last few years, Web interaction is slowly evolving to include more Rich Internet Applications (RIAs). RIAs provide rich graphical and interactive applications over the Internet which perform a portion of the logic calculation and processing on the client's computer. Unlike the thin-client paradigm of the current client-server architecture, in which all of the processing is typically done on the server with only the resulting static HTML page transmitted to the client, rich-client systems perform much of the calculation and processing on the client computer. Processing such as field validation, data formatting, sorting, filtering, tool tips, integrated video, behaviors, effects, and the like, which are better suited for client-side processing are moved to the client. This typically provides a much more satisfying user experience, in that certain processing and transitions occur much faster than if the user would have to wait for a server request and response with a new finished page for each application interaction.

In application, many RIA are implemented using interactive multimedia files that that are executed on a compatible player on the client computer. The interactive multimedia runtime containers (iMRC), which are the interactive multimedia files running on the media player, operate the user interface and underlying logic. The iMRC may also have a facility to communicate with a remote communication server to supplement the execution of the application. One example of an iMRC is an instance of a FLASH™ player running a SWF file. The native FLASH™ player file, the SWF file format, is downloaded to the client computer and runs on the FLASH™ player either standing alone or on top of the client's Web browser. FLASH™ allows considerable interactivity with the user and has facility to communicate with a FLASH™ COMMUNICATION SERVER (FCS) or MACROMEDIA INC.'s FLEX™ presentation server to supplement the FLASH™ RIA operation.

In RIAs, because many applications include animations as a part of the logic presentation, substantial coding is typically used to provide for the animation of objects that have an unknown existence and position at design time. Many parts of the RIA may be created by designers using timeline-based development environments. However, in order to implement the conditional animations, an experienced programmer is generally used to complete the application. This divided creation process adds a layer of complexity to the design and generally prohibits RIA development by pure design-oriented individuals.

In development environments suitable to generate RLAs, such as the FLASH™ development environment and MACROMEDIA INC.'s FLEX BUILDER™, there are generally three main divisions of the overall architecture: the tool, the framework, and the runtime. The tool is the user interface that the designer/developer interacts with to build the application. A framework, in general, is a set of classes, components, and the like that are specifically provided for the functionality of the development environment. The framework may contain many pre-built, useful components, such as windows, menus, and the like, along with defined events that can be used in assembling a completed application without the need to code everything from scratch. The runtime is the operational container that runs the executable file that results from compiling the application and framework. Conceptually, the framework runs on top of the runtime, while the application runs on top of the framework.

In existing systems, the framework is generally tied in with the tool. Thus, the developer creates the application using the tool and then compiles the application, which uses the framework, to produce the executable that is to be delivered as the RIA. The compiled file will sit at an accessible location until called by an accessing user. The user will have a runtime container on his or her computer that will play the executable file and execute the RIA. When creating an animation, the tool is used to define the motion path. The tool gives the motion path, which is defined according to the classes and event of the framework, to the framework to produce the final instructions for the motion path. The final instructions instruct the runtime how to render all of the pieces of the animation in executing the RIA. This architecture results in the instructions for the motion path being finalized at the tool, because the current systems have the framework tied in with the tool. Therefore, it is difficult to design an application that includes conditional animations.

BRIEF SUMMARY OF THE INVENTION

The present invention is directed to a system and method for generating a conditional animation of unknown objects. In creating the animation, a representative starting point is designated for an object. A representative ending point may also selected by the designer for the object. The designer/developer then creates a representative motion path for the objects. The designer defines a transformation to translate a position of unknown object, when it is determined, relative to the representative starting and ending points and the representative motion path. Therefore, as the actual starting and ending points are discovered, the transformation is applied to the points along the determined path, such that the actual positioning is applied to the representative path in a pre-determined manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
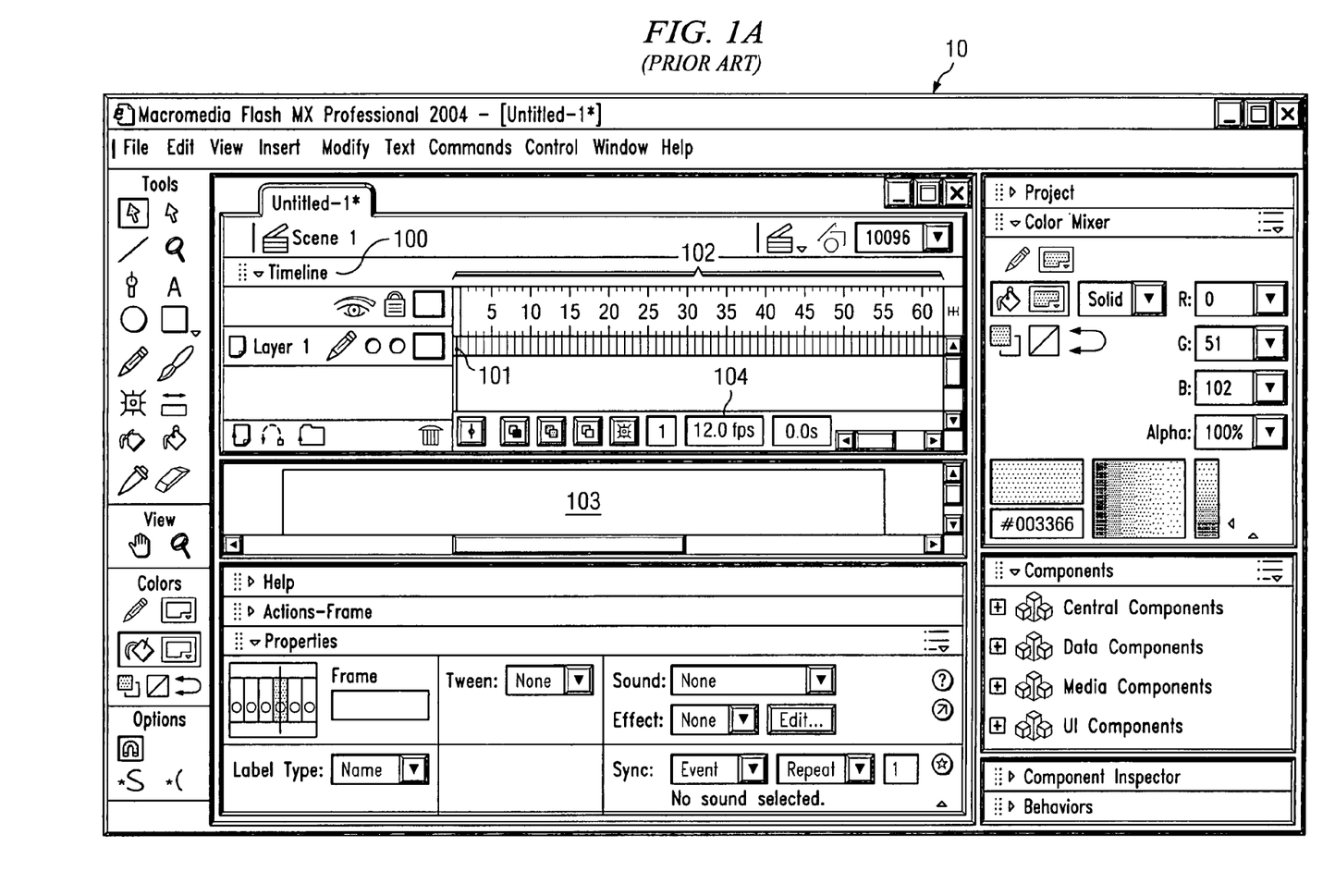
FIG. 1A is a screenshot illustrating a typical timeline-based development environment.

FIG. 1A is a screenshot illustrating a typical timeline-based development environment. Application development environment 10 is an interactive multimedia development environment (iMDE) that utilizes timeline 100 in its development process. An example of such an iMDE is previous versions of the FLASH™ development environment. The designer works on design canvas 103 to design and position a scene in the animation. Each scene is considered a frame for purposes of the animation. Timeline 100 comprises frame list 102 that makes up the entire animation. An individual frame, such as frame 101, that the user is currently working on may be highlighted on frame list 102. The scene that is designed on design canvas 103 is the scene representative of frame 101. As the designer steps through multiple frames list 102, design canvas 103 is transformed to the scene that is associated with that particular frame. The final animation file will then be compiled into an executable file ready to be downloaded and/or played on the compatible media player.

When the animation is run, a compatible media player will play the animation file moving from frame to frame to create the animation motion. Animation development environment 10 includes frame rate indicator 104 that allows the designer to set a particular frame rate for the animation. By manipulating the frame rate, the designer can control how fast or slow the animation will progress when running. However, animation development environment 10 does not have the capability to design an animation without a hard beginning point and end point.

Figure 1B:
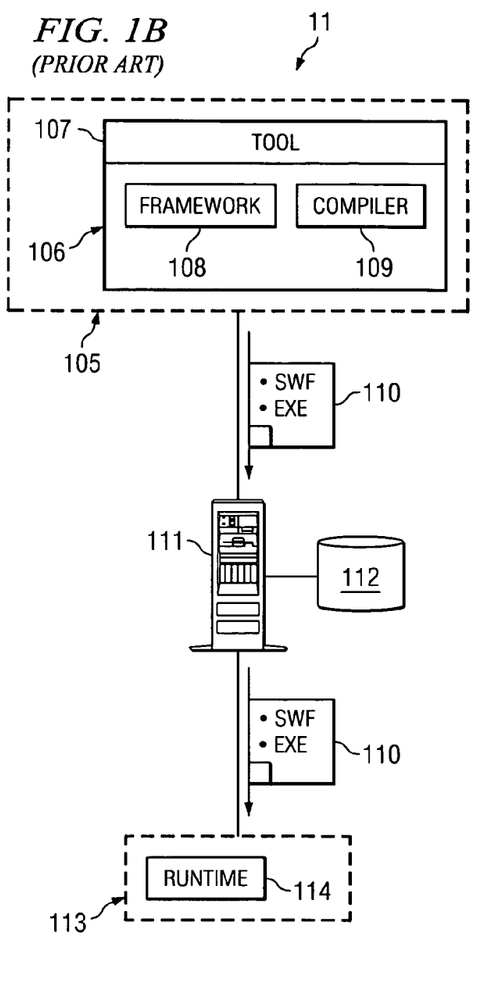
FIG. 1B is a block diagram illustrating typical RIA architecture.

FIG. 1B is a block diagram illustrating typical RIA architecture 11. In existing technology, RIA development environment 106 operates on developer computer 105. RIA development environment 106 includes tool 107, framework 108, and compiler 109. Tool 107 includes the user interface tools that allows a developer/designer to create the application. Tool 107 may include graphical design features that allow the designer to graphically create the application functionality as well as code design features that allow the designer/developer to supplement the visual part of the application with complex logic. Framework 108 includes the particular classes and events designed for RIA development environment 106. Once the designer/developer finishes designing and coding the application, he or she compiles the application file using compiler 109. Compiler 109 uses the code generated by tool 107, which includes code directly entered by the developer, and framework 108 to create the executable of the RIA. Executable file 110 may be an .EXE executable file, a SWF file, or other type of executable that will implement a RIA.

Executable file 110 will be transmitted to server 111 and stored on database 112. Client-users may access server 111, which may be a Web server, an application server, a communication server, or the like, and request access to the RIA represented by executable file 110. Client computer 113 requests access to the RIA from server 111. Server 111 accesses database 112 to retrieve executable file 110. Server 111 then transmits executable file 110 to client computer 113. In order to execute executable file 110, client computer 113 begins runtime 114, which provides a container for executing executable file 110. Executable file 110 runs within runtime 114 container on client computer 113 to implement the RIA. Because RIA development environment 106 produces an executable file, all of the instructions for the various RIA functionality are already set when executable file 110 is created by RIA development environment 106. The designer/developer provides any explicit animation instructions or code at RIA development environment 106. Once those instructions or that code have been entered and compiled by compiler 109, it is set for operation.

Figure 2A:
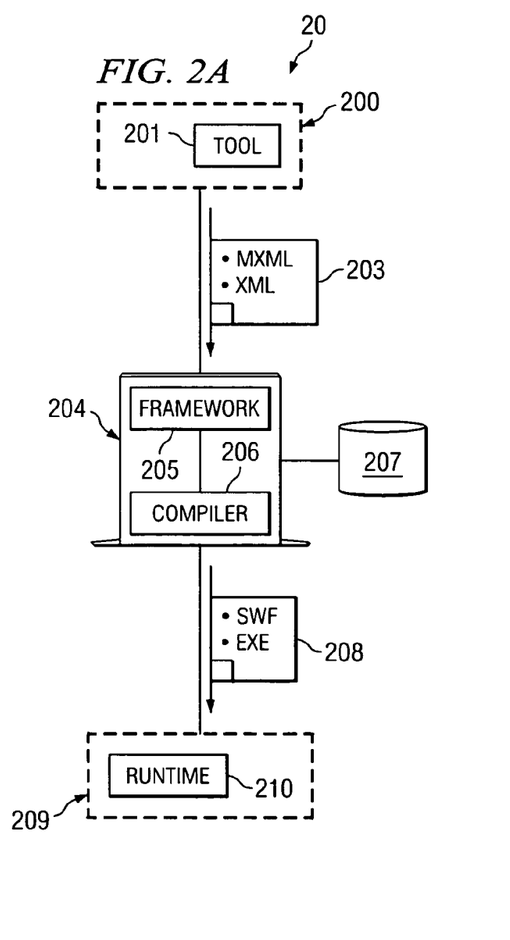
FIG. 2A is a block diagram illustrating a RIA deployment system configured according to one embodiment of the present invention.

FIG. 2A is a block diagram illustrating RIA deployment system 20 configured according to one embodiment of the present invention. Instead of tying framework 205 into RIA development environment 200, RIA deployment system 20 places framework 205 and compiler 206 in server 204. A designer creates a RIA using tool 201 of RIA development environment 200. Instead of setting the actual motion paths of any animations contained in the RIA, the designer may graphically set representative start and end points for a conditional animation and then define the motion path between those two points. To accommodate any actual beginning and ending points that end up being different than the two representative points, the designer also selects desired transforms that will be used to translate the actual points to correspond, in some controlled fashion, to the representative points and path.

The resulting file produced by RIA development environment 200's tool 201 may be a hybrid tag-based metalanguage that includes coding capabilities. An example of such a language is MACROMEDIA INC.'s MXML™, XML, and the like. Thus, RIA file 203 is transmitted to server 204 uncompiled, in the tag-based language format, and stored on database 207. RIA file 203 will not be compiled until a client makes a request to access the RIA. For example, client 209 requests the RIA from server 204. Server 204 retrieves RIA file 203 and, using framework 205, compiles it with compiler 206 to produce RIA executable file 208. When created, the designer used selected objects and events to define the representative information in any conditional animations. These objects and events are provided for in framework 205 on compilation.

In creating RIA executable file 208, server 204 also performs any data harvesting or processing to produce the content of the resulting RIA. Therefore, framework 205 and compiler 206 operate in conjunction to turn the representative motion points into an actual motion path. RIA executable file 208 includes the specific instructions for runtime 210 to implement the RIA on client 209. Thus, when client 200 receives RIA executable file 208, it is run within runtime 210 to produce the actual motion and animation for the application.

Figure 2B:
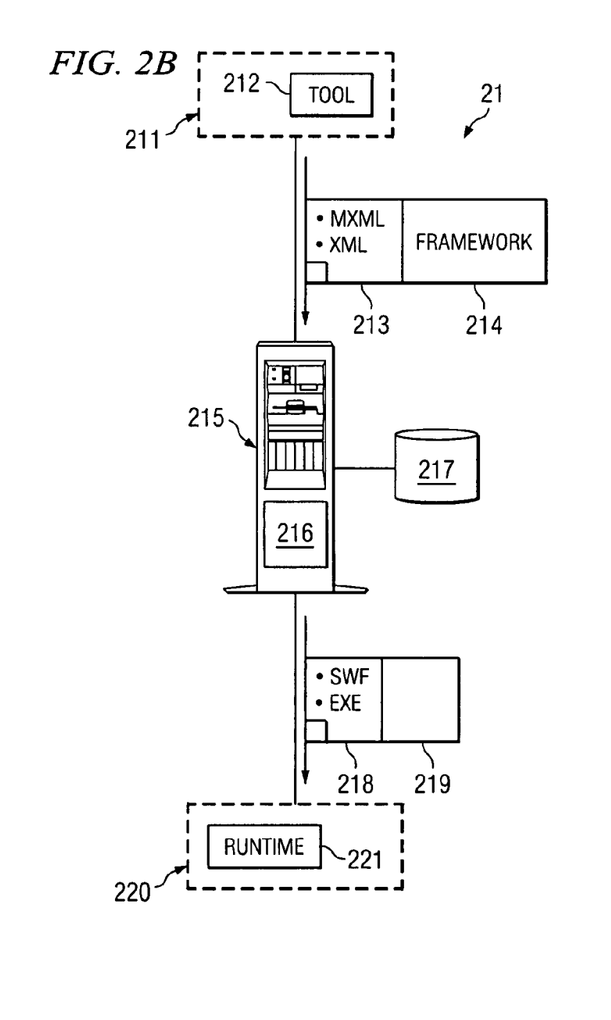
FIG. 2B is a block diagram illustrating a RIA deployment system configured according to an additional and/or alternative embodiment of the present invention.

FIG. 2B is a block diagram illustrating RIA deployment system 21 configured according to an additional and/or alternative embodiment of the present invention. A designer creates a RIA using tool 212 of RIA development environment 211. In generating RIA file 213, which may comprise a tag-based, metalanguage, such as MXML™, XML, or the like, tool 212 adds or appends framework packet 214 in association with RIA file 213. The RIA package of RIA file 213 and framework packet 214 would be stored on database 217. On request of client 220, server 215 partially compiles RIA file 213 using framework packet 214. The partially compiled RIA executable file 218 is generated with framework packet 219 added or appended.

Client 220 downloads RIA executable file 218 and framework packet 219 to run on runtime 221. Part of runtime 221 includes a compiler that will finish compiling RIA executable 218 using framework packet 219. Using this process, the designer is able to parameterize the conditional motion or animation at tool 212, part of which may be realized when server 215 partially compiles into RIA executable file 218, and the remaining part that may be set by the user interacting at client 220 and completely compiled into the running application by runtime 221. Therefore, the final animation is not finalized until the RIA is operating on client 220.

Figure 3A:
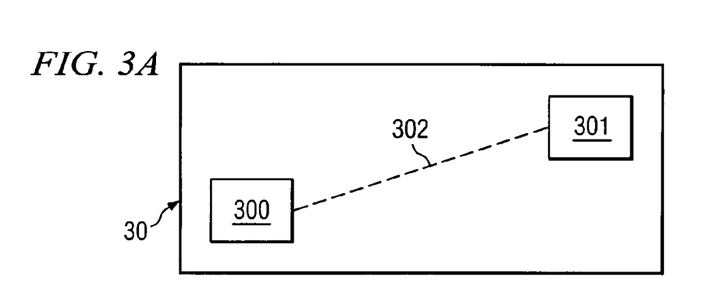
FIG. 3A is a block diagram illustrating a design canvas of an application development environment (ADE) configured according to one embodiment of the present invention.

FIG. 3A is a block diagram illustrating design canvas 30 of an application development environment (ADE) configured according to one embodiment of the present invention. The ADE provides design canvas 30 in which the designer graphically creates the application and any animations that may be included in the application. In order to define an animation where the beginning and end points are unknown, the designer begins by designating a representative beginning point, beginning point 300. The designer then designates a representative end point, end point 301. The designer may then define the motion that is to occur between beginning point 300 and end point 301, i.e., motion path 302.

It should be noted that various techniques for graphically interacting with a design view of an ADE may be used to set beginning point 300 and end point 301. For example, the designer may manipulate a mouse cursor or other such pointing device to position the cursor at the point at which either endpoint is desired. By selecting one or the other mouse button, the designer may designate the selected point. Additionally, the designer may drag an object icon onto design canvas 30 and drop it at the desired location of the endpoints. To define the motion, various embodiments of the present invention may provide an interface to the user in which the user may select pre-defined motion algorithms or enter formulae or other such code to explicitly define the motion. The embodiments of the present invention are not specifically limited to using one method or another.

The animation defined in FIG. 3A comprises a linear path, motion path 302, between two endpoints, beginning point 300 and end point 301. Once the representative points and motion have been set by the designer, he or she then defines an transformation, such as an affine transformation, that may be used to translate the animation from points other than the representative endpoints, beginning point 300 and end point 301.

In practice, when displaying options for the animator, affine transformations may be simplified into three basic transforms that may be applied to motion path 302 to conform the actual starting and ending points to the defined motion: Scaling; Rotation; and Skew. Scaling may be used to offset motion path by a set scalar amount in the X- or Y-axis directions, or both. Motion path 302 may also be rotated relative to a radial center point. Motion path 302 may also be skewed, either in the X- or Y-axis directions. Therefore, when an actual beginning point is calculated to be in a location different than beginning point 300, the transformation will be used to transform the points along the defined path, motion path 302, onto a new path that begins with the actual beginning point and ends at the actual end point. The newly determined path will follow the original representative path only modified by the selected transformation scheme.

Figure 3B:
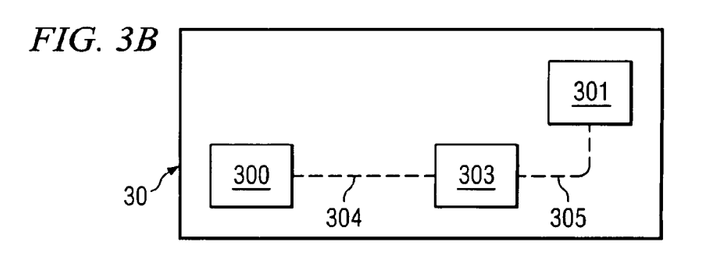
FIG. 3B is a block diagram illustrating an ADE configured according to one embodiment of the present invention, in which an intermediate point is used in defining an animation.

FIG. 3B is a block diagram illustrating an ADE configured according to one embodiment of the present invention, in which an intermediate point is used in defining an animation. Linear motion between two endpoints is a very simple animation to describe and implement. However, it may be desirable to define more complex motion in a given animation. In a timeline-based development environment, complex motion is usually defined using intermediate animation points or key frames to describe the appearance of the scene at any selected time for the intermediate point. For example, the designer designates beginning point 300 and end point 301 as the representative endpoints for the animation, but then places intermediate point 303 onto design canvas 30. The designer would then define motion paths 304 and 305 to control the motion between beginning point 300 and intermediate point 303 and between intermediate point 303 and end point 301. The defined motion depicted in FIG. 3B appears to give an exponential motion path to the object that will cross over intermediate point 303.

Figure 3C:
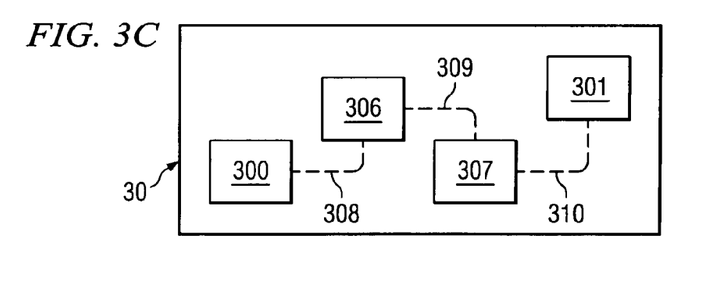
FIG. 3C is a block diagram illustrating an ADE configured according to one embodiment of the present invention, in which multiple intermediate points are used in defining an animation.

FIG. 3C is a block diagram illustrating an ADE configured according to one embodiment of the present invention, in which multiple intermediate points are used in defining an animation. The more complex a motion that is desired by the designer, the greater likelihood that multiple intermediate points will be used. For example, the designer designates beginning point 300 and end point 301 as the representative endpoints for the animation, and then places intermediate points 306 and 307. The designer would then define motion paths 308-310 to control the motion in the animation from beginning point 300 to end point 301. The overall motion path of an object defined in FIG. 3C appears to define a gradually rising sinusoidal path.

In addition to defining the points and paths of motion to be executed on various animations, the designer may define and/or apply functions that control how the motion will occur across the path. Such functions, typically referred to as easing functions, define the manner in which motion will occur along the path. For example, with regard to the path illustrated in FIG. 3A, an easing function may be applied that provides for the object to begin motion slowly, pick up speed in the middle, and then slow down prior to reaching end point 301. This motion variation may provide a more pleasing and/or natural appearance to the user interacting with the end runtime application.

Similarly, an easing function may be applied to the motion illustrated in FIG. 3C that provides for the object to exhibit the characteristic motion that it might have if affected by gravity. For example, when the motion begins at beginning point 300, the object moves quickly, but begins to decelerate at the gravitation rate as it nears intermediate point 306. The object will then accelerate at the gravitational rate as it approaches intermediate point 307 along motion path 309. At intermediate point 307, an abrupt change of direction may occur, similar to a ball bouncing off of a hard surface, with the quick motion being decelerated at the gravitational rate again as the object approaches end point 301. Such easing functions allow the designer to control the exact movement of the object, thereby giving the same motion path a different feel depending on what easing function is applied.

Figure 4:
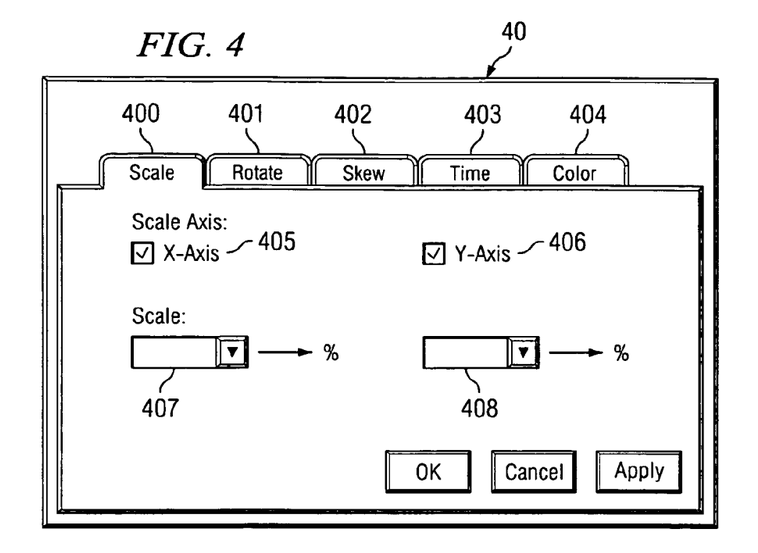
FIG. 4 is a diagram illustrating a transformation dialog presented in an ADE configured according to one embodiment of the present invention.

FIG. 4 is a diagram illustrating transformation dialog 40 presented in an ADE configured according to one embodiment of the present invention. After designating the representative beginning and ending points, along with any intermediate points, and defining the motion path, the designer may then select the transformation to use in translating the actual beginning and ending points to the representative motion. The ADE of FIG. 4 presents transformation dialog 40 to the designer in order to allow selection of the desired transformation. Transformation dialog 40 is implemented as a tabbed navigation object with separate tabs for the different available transformations: scale 400, rotate 401, and skew 402. Transformation dialog 40 also presents time 403, which allows selections for handling any variation of timing that should be made commensurate with the transformation selected.

Transformation dialog 40 illustrates scale 400 as the active tab. In selecting a scaling transformation, the designer may select X-axis check box 405 and/or Y-axis check box 406 in order to apply the scaling to either one or both of the X- and Y-axes. In the illustrated example, the designer has selected both check boxes 405 and 406 to apply a scaling transformation. The designer may then enter the exact scalar in X-axis scale field 407 and Y-axis scale field 408. If the designer had desired to apply a different transformation, he or she would select the tab corresponding with the desired transform and interact with the interface elements that are designed for that transformation.

Figure 5:
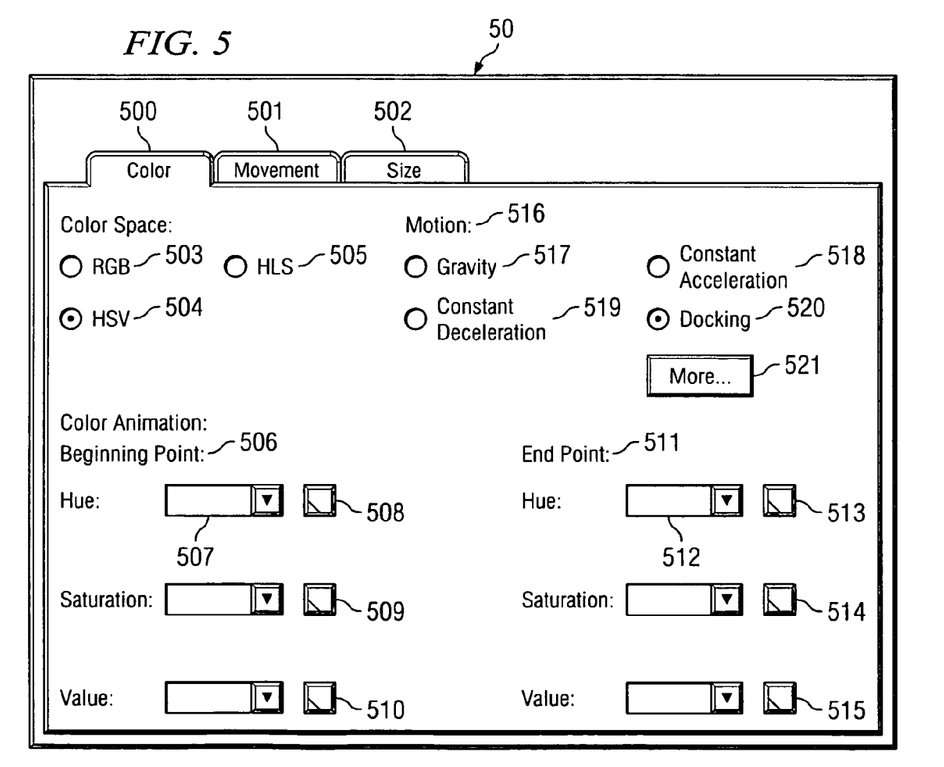
FIG. 5 is a diagram illustrating a motion dialog in an ADE configured according to one embodiment of the present invention.

FIG. 5 is a diagram illustrating motion dialog 50 in an ADE configured according to one embodiment of the present invention. When developing animation, objects may undergo motion of various forms. For example, an object may move from one location on a display to another. Another example of motion may be an object that changes in size or shape. There may be very little translational motion, but there is motion in the growth or shrinkage of the object. Still another example of motion is a color change. An object may change from one color to another. The speed and color transition that this color motion goes through are just two parameters that would need to be considered when describing the motion.

In the example embodiment of FIG. 5, motion dialog 50 is displayed as a tabbed navigation container with multiple tab pages: color interface 500, movement interface 501, and size interface 502. Each tab page contains the interface elements for defining the parameters for that type of motion. In the described example, color 500 is active, which identifies that the motion to be applied to the object is a color motion. In constructing the color motion, a designer selects the particular color space across which the motion is to occur. Color space is the particular color scheme that is used to define the progress across the color spectrum. Motion dialog 50 provides options of Red Green Blue (RGB) 503, Hue Saturation Value (HSV) 504, and Hue Lightness Saturation (HLS) 505, of which the designer has selected HSV 504.

Color interface 500 also provides an interface for the designer to designate the color for the endpoints in beginning point interface 506 and end point interface 511. To designate the color with beginning point interface 506, the designer may set the hue value with hue value field 507 or may call up a color hue wheel with hue wheel selector 508. The designer may then set the remaining values with saturation selectors 509 and value selectors 510. To designate the color in end point interface 511, the designer sets the hue value here with hue value field 512 or may call up a color hue wheel in hue wheel selector 513, the saturation with saturation selectors 514, and the value with value selectors 515.

The designer may also assign pre-defined easing functions in motion interface 516. Motion interface 516 offers selections for gravity function 517, constant acceleration function 518, constant deceleration 519, and docking function 520. The designer has selected docking function 520, which applies an easing function that starts the motion slowly, speeds up, and then slows down before reaching the endpoint. This motion, while more noticeable in translational movement or size movement, is still applicable to the transition from the beginning point color to the end point color.

Figure 6:
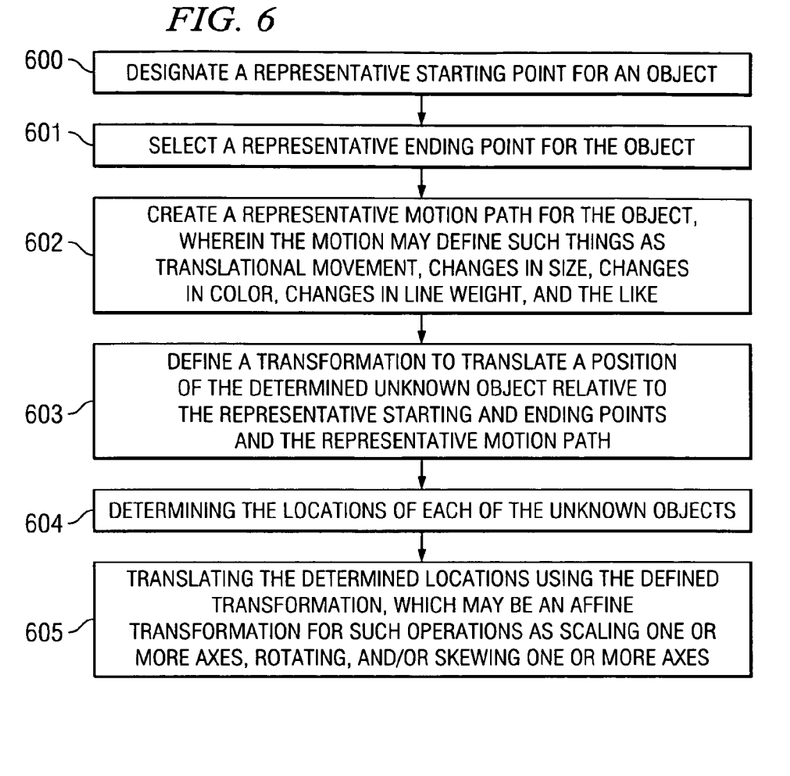
FIG. 6 is a flowchart illustrating example steps executed in implementing one embodiment of the present invention.

FIG. 6 is a flowchart illustrating example steps executed in implementing one embodiment of the present invention. In step 600, a representative starting point is designated for an object. A representative ending point is also selected, in step 601, for the object. In step 602, a representative motion path is created for the object that defines such things as translational movement, changes in size, changes in color, changes in line weight, and the like. A transformation is defined, in step 603, to translate a position of the determined unknown object relative to the representative starting and ending points and the representative motion path. The locations of each of the unknown objects are determined in step 604. The determined locations and then translated, in step 605, using the defined transformation, which may be an affine transformation for such operations as scaling one or more axes, rotating, and/or skewing one or more axes.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 7:
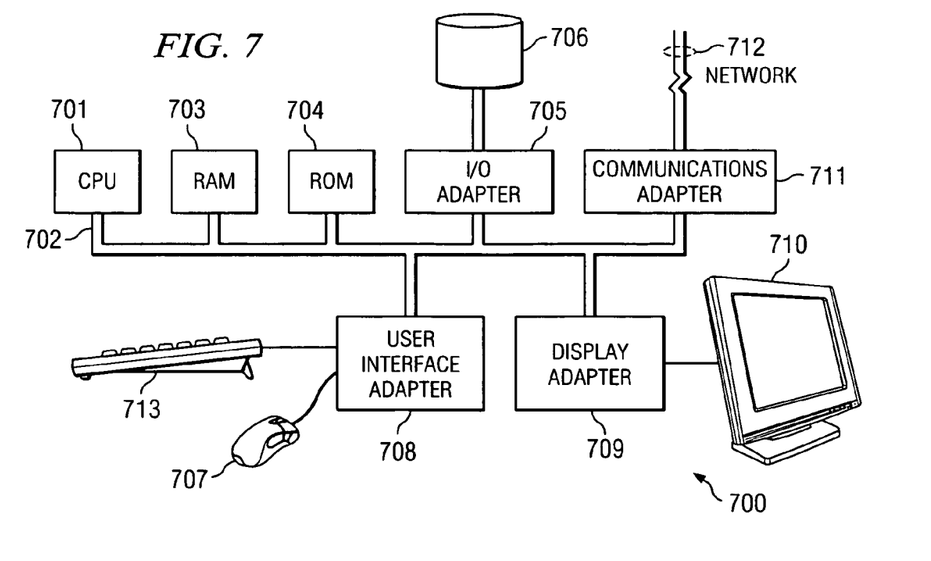
FIG. 7 illustrates a computer system adapted to use embodiments of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and the like, to the computer system 700. The display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
designating a representative starting point for an animation of a conditional object, wherein said conditional object represents an unknown object that is not determined until runtime;
creating a representative motion path for said animation of said conditional object, wherein said representative motion path defines runtime motion of said runtime-determined unknown object on a display screen; and
defining a transformation to translate said representative starting point and said representative motion path relative to a position of said runtime-determined unknown object when said position of said runtime-determined unknown object differs from the representative starting point.

2. The method of claim 1 further comprising:
selecting a representative ending point for said conditional object, wherein, based on an ending point position determined at runtime that differs from the representative ending point said transformation also translates, at runtime, said representative ending point.

3. The method of claim 1 wherein said designating, said creating, and said defining occur in an application development environment (ADE).

4. The method of claim 1 wherein said transformation comprises an affine transformation.

5. The method of claim 4 wherein said affine transformation provides for translation according to one or more of:
scaling one or more axes;
rotating; and
skewing one or more axes.

6. The method of claim 1 wherein said animation comprises one or more of:
translational movement;
change in size;
change in color; and
change in line weight.

7. A computer implemented method comprising:
defining a representative starting position for an animation of each of one or more conditional objects, wherein said one or more conditional objects represent an unknown object that is not determined until runtime;
designing a path for said animation wherein, said path defines runtime motion of said runtime-determined one or more conditional objects on a display screen; and
selecting a transform for translating, at runtime, said representative starting position and said path relative to a position of each of said one or more runtime-determined conditional objects when said position determined at runtime differs from said representative starting position.

8. The method of claim 7 further comprising:
defining a representative ending position for each of said one or more objects, wherein, based on an ending position determined at runtime that differs from said representative ending position, said transform also translates, at runtime, said representative ending position.

9. The method of claim 7 wherein selecting said transform comprises:
selecting an affine transformation.

10. The method of claim 9 wherein said affine transformation translates according to one or more of:
scaling;
rotating; and
skewing.

11. The method of claim 7 further comprising:
presenting an interface window to a user for said selecting.

12. The method of claim 7 wherein said translating occurs in one or more of:
a server administering said completed animation; and
a media player operating on a client computer requesting to play said animation.

13. A computer program product having a computer readable medium with computer program logic recorded thereon, said computer program product comprising:
code, responsive to user input, for designating a representative starting point for animation of an object representing an unknown object, wherein the unknown object is not determined until runtime;
code, responsive to said user input, for creating a representative motion path for said animation of said object, wherein said representative motion path defines runtime motion of said runtime-determined unknown object on a display screen; and
code, responsive to said user input, for transforming said representative starting point and said representative motion path relative to a position of said runtime-determined unknown object when said position of said runtime-determined unknown object differs from the representative starting point.

14. The computer program product of claim 13 further comprising:
code, responsive to said user input, for selecting a representative ending point for said object, wherein, based on an ending point position determined at runtime that differs from said representative ending point, said code for transforming also translates, at runtime, said representative ending point.

15. The computer program product of claim 13 wherein said code for designating, said code for creating, and said code for transforming reside in an application development environment (ADE).

16. The computer program product of claim 13 wherein said code for transforming comprises code for an affine transformation.

17. The computer program product of claim 16 wherein said code for an affine transformation provides code for translation according to one or more of:
scaling one or more axes;
rotating; and
skewing one or more axes.

18. The computer program product of claim 13 wherein said animation comprises one or more of:
translational movement;
change in size;

change in color; and change in line weight.

19. A system comprising:

a server having a central processing unit (CPU);

a communications adapter coupled to said CPU and configured to provide said server access to a network;

a storage device coupled to said CPU;

a compiler stored on said storage device and executable by said CPU;

an uncompiled application stored on said storage device, wherein said uncompiled application comprises:

a representative starting point for an animation of a conditional object, wherein said conditional object represents an unknown object that is not determined until runtime; and a transform configured to translate said representative starting point and said representative motion path relative to a position of said runtime-determined unknown object when said position of said runtime-determined unknown object differs from said representative starting point;

wherein, responsive to receiving a request to access said uncompiled application, said server is configured to:

determine said unknown object;

provide said determined unknown object and an application framework to said compiler; and execute said compiler to produce an executable application file using one or both of said representative starting point and said transform; and wherein said communications adapter is configured to transmit over said network said executable application file to a user from which said request is received.

20. The system of claim 19 wherein said uncompiled application further comprises:

a representative ending position for said conditional object, wherein, based on an ending point position of said determined unknown object, said transform also translates said representative ending position.

21. The system of claim 19 wherein said transform comprises an affine transform.

22. The system of claim 19 further comprising:

a media player operating on a client computer of said user, wherein said client computer is coupled to said server over said network, wherein, responsive to receiving said executable application file, said media player is configured to run said executable application for display to said user on a display device of said client computer.

* * * * *